(12) United States Patent
Tsunetsugu et al.

(10) Patent No.: US 7,537,817 B2
(45) Date of Patent: May 26, 2009

(54) VACUUM HEAT INSULATOR AND APPARATUSES USING THE SAME (75) Inventors: Keisuke Tsunetsugu, Osaka (JP); Hiroto Nakama, Osaka (JP)

(73) Assignee: Panasonic Corporation, Osaka (JP)

( * ) Notice: Subject to any disclaimer, the term of this patent is extended or adjusted under 35 U.S.C. 154(b) by 179 days.

(21) Appl. No.: 10/552,209

(22) PCT Filed: Mar. 29, 2004

(86) PCT No.: PCT/JP2004/004395

§ 371 (c)(1),
(2), (4) Date: Jun. 29, 2006

(87) PCT Pub. No.: WO2004/094891

PCT Pub. Date: Nov. 4, 2004

(65) Prior Publication Data

US 2006/0263571 A1 Nov. 23, 2006

(30) Foreign Application Priority Data

Apr. 18, 2003 (JP) ............................ 2003-113877
Oct. 7, 2003 (JP) ............................ 2003-348217

(51) Int. Cl.
*B32B 1/06* (2006.01)
(52) U.S. Cl. .......................................... 428/69
(58) Field of Classification Search ............... 428/69
See application file for complete search history.

(56) References Cited

U.S. PATENT DOCUMENTS 5,900,299 A * 5/1999 Wynne ........................ 428/69

FOREIGN PATENT DOCUMENTS

| JP | 57-155570 | 9/1982 |
| JP | 4-64089 U | 6/1992 |
| JP | 07-269781 A | 10/1995 |
| JP | 10-205995 | 8/1998 |
| JP | 11-280987 A | 10/1999 |

(Continued)

OTHER PUBLICATIONS

International Search Report for PCT/JP2004/004395, dated May 18, 2004.
Microfilm of the specification and drawings annexed to the request of Japanese Utility Model Application No. 107427/1990 (Laid-open No. 64089/1992) Sharp Corp., Jun. 1, 1992 (with partial English translation).

*Primary Examiner*—Alexander Thomas
(74) *Attorney, Agent, or Firm*—RatnerPrestia (57) ABSTRACT In a vacuum heat insulator, a heat seal layer of its enveloping member of a laminated structure is made of a film having a melting point of at least 200° C. Alternatively, the heat seal layer is made of a film having a melting point above 100° C. and below 200° C., and fins are bent on a low-temperature side. Either of these structures can inhibit a decrease in gas barrier property even in a high-temperature atmosphere of approx. 150° C. Thus, the heat-insulating property of the vacuum heat insulator is maintained for a long period of time. This vacuum heat insulator is preferable for an apparatus that has a heat source or a portion to be kept warm exceeding a temperature of 100° C.

6 Claims, 7 Drawing Sheets

FOREIGN PATENT DOCUMENTS

| | | |
|---|---|---|
| JP | 2001-008828 A | 1/2001 |
| JP | 2001-141179 A | 5/2001 |
| JP | 2001-265138 A | 9/2001 |
| JP | 2002-048466 A | 2/2002 |
| JP | 2003-074786 A | 3/2003 |
| JP | 2001-032992 A | 7/2003 |

* cited by examiner

VACUUM HEAT INSULATOR AND APPARATUSES USING THE SAME

This application is a U.S. National Phase application of PCT International Application PCT/JP2004/004395.

1. Technical Field

The present invention relates to a vacuum heat insulator and apparatuses using the vacuum heat insulator. It particularly relates to heat insulation or keep warm in apparatuses having high-temperature portions, including printing machines such as a copying machine and laser printer, electronic equipment such as a computer, and further a water heater.

2. Background Art

A vacuum heat insulator is a heat insulator in which filling an enveloping member with foam resin, powder, or fiber material to form a core material and making the interior of the enveloping member vacuum considerably reduces its gaseous thermal conductivity. To maintain the heat-insulating property for a long period of time, the interior of the heat insulator is kept to vacuum.

There is an electric kettle with considerably reduced power consumption for its thermal insulation because of such a vacuum heat insulator provided along the outer periphery of a water-storage to heat-insulate. For this vacuum heat insulator, metal foil is used on the side exposed to high temperatures and a deposited layer is used on the side exposed to low temperatures in a gas barrier layer of a laminated film constituting the enveloping member. This constitution allows excellent gas barrier property, vacuum condition and heat-insulating property on the high-temperature side to be kept at temperatures of approx. 100° C. for a long period of time. On the other hand, use of a deposited layer on the low-temperature side prevents heat from flowing into its interior through the metal foil, thus improving the heat-insulating property of the entire vacuum heat insulator. Such a vacuum heat insulator is disclosed in Japanese Patent Unexamined Publication No. 2001-8828, for example.

However, a conventional vacuum heat insulator using a general resin film as its enveloping member can only be used at temperatures lower than those slightly above 100° C. In a fixing unit of a copying machine, for example, an outer frame that houses the fixing part including a fixing roller and a delivery roller is provided using an engineering resin having heat-insulating property and heat resistance. Such a fixing unit is disclosed in Japanese Patent Unexamined Publication No. 57-155570, for example.

As described above, the conventional vacuum heat insulator maintains sufficient heat-insulating property for a long period of time in application to a portion having temperatures up to 100° C., like an electric kettle. However, in the portion having a heater of the electric kettle in its hot-water storage, or a fixing unit used for a copying machine or a laser printer, its temperature reaches approx. 150° C. When the conventional vacuum heat insulator is installed in such a place, the degree of vacuum deteriorates at parts with insufficient heat resistance, and thus a predetermined heat-insulating property cannot be maintained for a long period of time.

Further, the enveloping member of the conventional vacuum heat insulator is made of a flammable film, such as nylon or polyethylene terephthalate, and does not have flame retardance. On the other hand, in application to electronic equipment, vacuum heat insulators must have flame retardance similar to that of other components. Especially when a vacuum heat insulator is installed in a small space in a notebook type computer or the like, even a thin vacuum heat insulator must have flame retardance because it is placed in proximity to precision components in the computer.

SUMMARY OF THE INVENTION

A vacuum heat insulator of the present invention has a core material, and an enveloping member of a laminated structure including a heat seal layer, gas barrier layer, and protective layer. The heat seal layer is made of a resin having a melting point of at least 200° C., and the melting points of the gas barrier layer and protective layer are higher than that of the heat seal layer. Alternatively, the heat seal layer is made of a resin having a melting point above 100° C. and below 200° C., the melting point of the protective layer is at least 200° C., and fins are bent on a low-temperature side. Either of these structures can prevents degradation of gas barrier property in a high-temperature atmosphere of approx. 150° C. Thus, the heat-insulating property of the vacuum heat insulator can be maintained for a long period of time. An apparatus of the present invention includes a heat source or thermally insulated portion at temperatures above 100° C. therein, and the vacuum heat insulator insulates the heat.

DETAILED DESCRIPTION OF PREFERRED EMBODIMENTS

Figure 1:
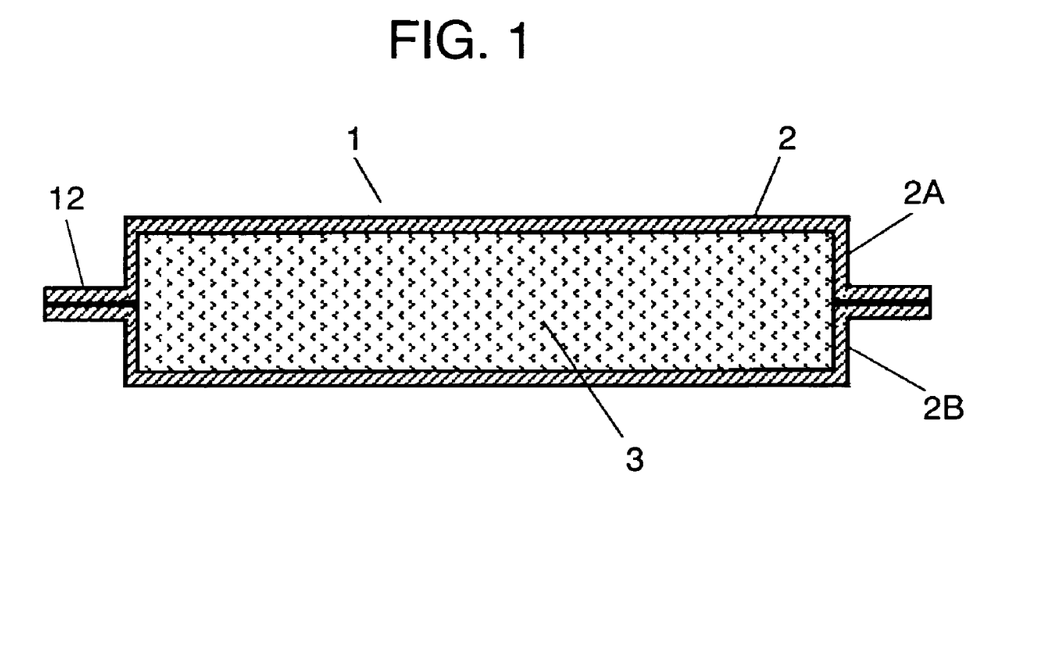
FIG. 1 is a sectional view of a vacuum heat insulator in accordance with an exemplary embodiment of the present invention.
Figure 2:
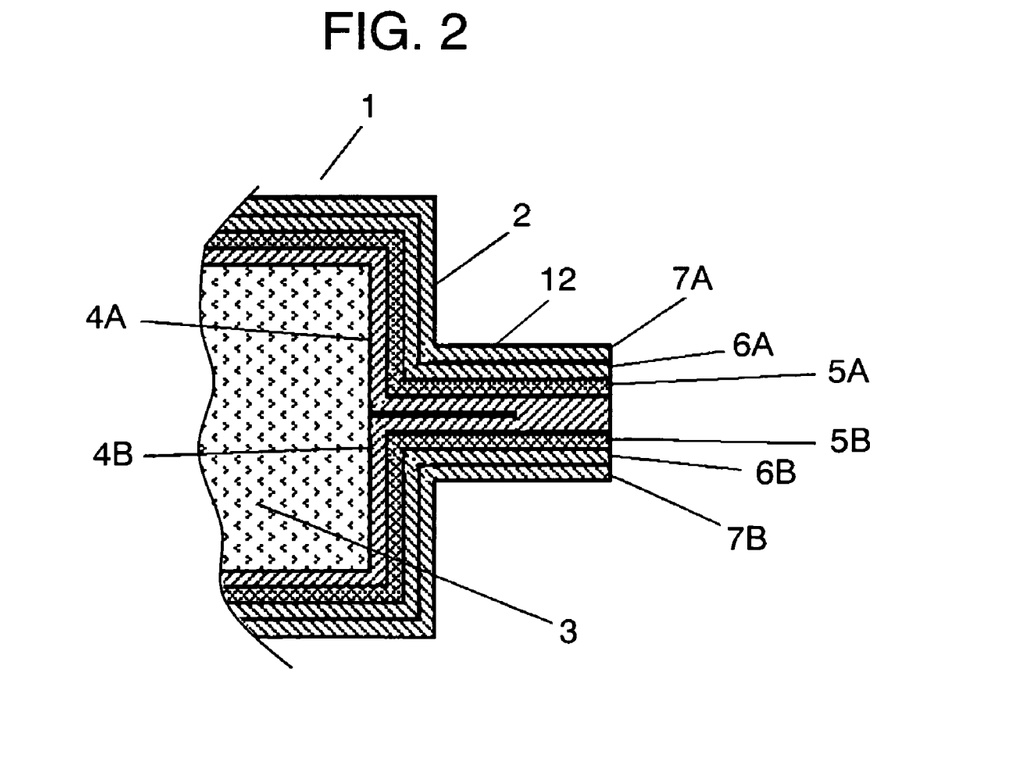
FIG. 2 is a sectional view of an essential part showing a fin of the vacuum heat insulator in accordance with the exemplary embodiment.

FIG. 1 is a sectional view of a vacuum heat insulator in accordance with an exemplary embodiment of the present invention. FIG. 2 is a sectional view of an essential part showing a fin of the vacuum heat insulator. Enveloping member 2 that is made of two sheets of laminated films (hereinafter referred to simply as films) 2A and 2B facing to each other covers core material 3. The inside of enveloping member 2 is evacuated and the periphery thereof is heat-sealed to form vacuum heat insulator 1.

The two kinds of films 2A and 2B are composed of heat seal layers 4A and 4B, gas barrier layers 5A and 5B, first protective layers 6A and 6A, and second protective layers 7A and 7B, respectively.

Film 2A is used as a heat-insulating surface on a high-temperature side. For heat seal layer 4A, a polychlorotrifluoroethylene (50-μm-thick) having a melting point of 210° C. is used. Having a low melting point among fluorine resin films, polychlorotrifluoroethylene is easy to use and excellent in gas barrier property. In consideration of placement on the high-temperature side, 6-μm-thick aluminum foil is used for gas barrier layer 5A. For protective layer 6A, a polyethylenenaphthalate (12-μm-thick) having a melting point of 270° C. is used. For protective layer 7A, a tetrafluoroethylene-ethylene copolymer (25-μm-thick) having a melting point of 260° C. is used.

Film 2B is used as a heat-insulating surface on a low-temperature side. For heat seal layer 4B, a polychlorotrifluoroethylene (50-μm-thick) is used as same as film 2A. For gas barrier layer 5B, a polyethylenenaphthalate film (12-μm-thick) having a 0.05-μm-thick aluminum layer deposited thereon is used. For protective layer 6B, a polyethylenenaphthalate film (12-μm-thick) having a 0.05-μm-thick aluminum layer deposited inside thereof is used to enhance gas barrier property. For protective layer 7B, a tetrafluoroethylene-ethylene copolymer (25-μm-thick) having a melting point of 260° C. is used.

In fabrication of vacuum heat insulator 1, films 2A and 2B are faced to each other and, for example, three sides are heat-sealed to form a bag into which a core material is inserted. Sealing configurations of the bag include a four-sided seal type, gusset bag type, three-sided seal type, pillow case type and center tape seal type. However, sealing configurations of the bag are not limited to these.

For core material 3, fumed silica having an average primary particle diameter of 7 nm is used. Carbon black having a powder specific resistance of 0.6 cm/Ω is uniformly distributed and filled in the fumed silica. The content of carbon black is 5 wt %. Core material 3 is inserted into the bag of enveloping member 2 together with calcium oxide, i.e. a moisture absorbent. The inside of the enveloping member is evacuated to a pressure of 10 Pa and the remaining one side of the enveloping member is heat-sealed to provide 6-mm-thick vacuum heat insulator 1.

The heat conductivity of vacuum heat insulator 1 using these materials is 0.004 W/mK. The heat conductivity of vacuum heat insulator 1 after an accelerated test under aging condition equivalent to five years left in an atmosphere of 150° C. is 0.0115 W/mK.

Figure 3A:
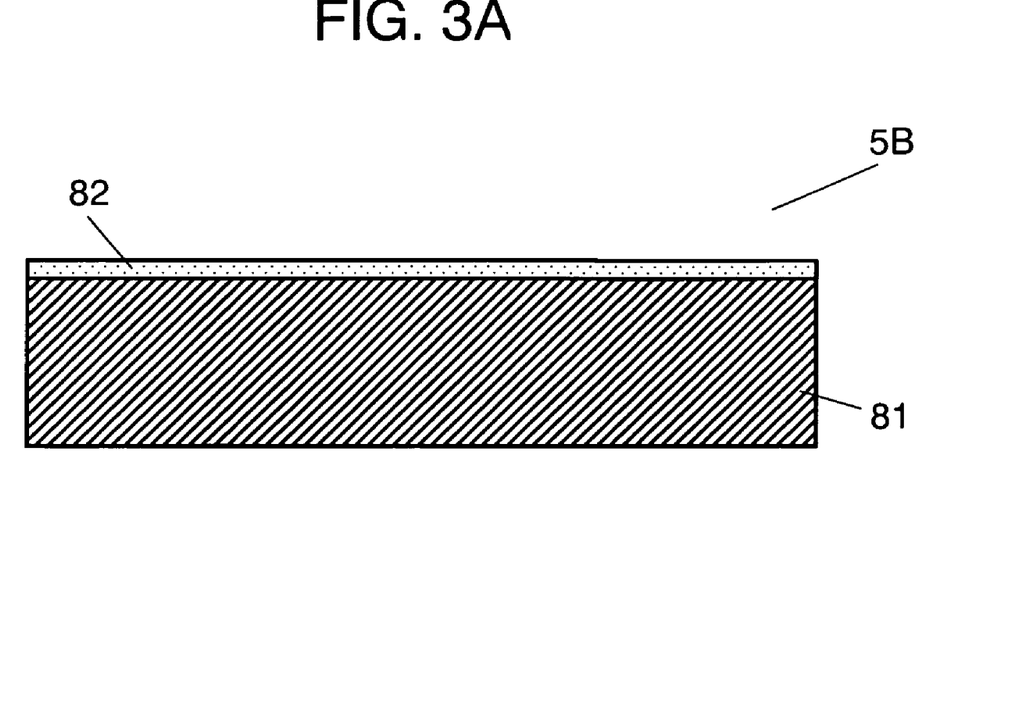
FIGS. 3A and 3B are sectional views each showing a structure of a gas barrier layer for use in the vacuum heat insulator in accordance with the exemplary embodiment.

As shown in FIG. 3A, deposited layer (gas barrier film) 82 of aluminum deposited on substrate 81 of polyethylenenaphthalate is formed in gas barrier layer 5B. Substrate 81 is made of polyethylenenaphthalate having a continuous maximum working temperature of 160° C. specified in UL 746B. The heat-resistant temperature of deposited layer 82 is at least 200° C. For this reason, gas barrier layer 5B is excellent in heat resistance. Additionally, because the gas barrier layer is made of polyethylenenaphthalate having deposited layer 82 provided to enhance gas barrier property, its gas barrier property is improved. Placing this gas barrier layer on the low-temperature side improves the gas barrier property of vacuum heat insulator 1. Such materials can also be used for gas barrier layer 5A.

When flammability of these materials are confirmed according to Test for Flammability of Plastic Materials for Parts in Devices and Appliance specified in UL94 safety standard, results equivalent to V-0 of this standard are obtained even on the end face of fin 12.

As described above, the melting points of heat seal layers 4A and 4B are at least 200° C., which is higher than the ambient temperature during use by 50 K or more. For this reason, heat seal layers 4A and 4B do not melt even in a high-temperature atmosphere of 150° C., and thus degradation of the gas barrier property of heat seal layers 4A and 4B is inhibited. Therefore, degradation of heat conductivity is small and heat-insulating property of the vacuum heat insulator is maintained for a long period of time. Also, for gas barrier layers 5A and 5B, and protective layers 6A to 7B, films having melting points higher than those of heat seal layers 4A and 4B are used. For this reason, when enveloping material 2 is heat-sealed, gas barrier layers 5A and 5B and protective layers 6A to 7B do not melt. Thus, highly reliable vacuum heat insulator 1 can be fabricated.

Additionally, it is preferable to use enveloping member 2 of a laminated structure, and flame-retardant films having a flame retardance of VTM-2 or higher specified in UL94 safety standard for at least protective layers 7A and 7B. It is more preferable to use flame-retardant films having a flame retardance of VTM-2 or higher specified in UL94 safety standard for heat seal layers 4A and 4B, gas barrier layers 5A and 5B, and protective layers 6A and 6B. This constitution can render flame retardance to vacuum heat insulator 1 and improve its safety during use.

Any resin film that has a melting point of at least 200° C. and heat seal property can be used for heat seal layers 4A and 4B without limitation. Desirable materials include: polyethylenenaphthalate having a melting point of 270° C.; and fluorine resin films, including polychlorotrifluoroethylene having a melting point of 210° C., tetrafluoroethylene-ethylene copolymer having a melting point of 260° C., and tetrafluoroethylene-hexafluoropolypropylene copolymer having a melting point of 285° C. In particular, fluorine resin films are preferable because they have considerably high melting points and flame retardance. Among these, a polychlorotrifluoroethylene film has a low melting point, and thus is easy to use and economical.

For gas barrier layer 5A, any material having a melting point higher than those of the films used for heat seal layers 4A and 4B can be used without limitation. Metal foil, a film having metal or inorganic oxide deposited thereon, and even a resin film can be used if the resin film has high gas barrier property. For example, as metal foil, aluminum foil is often used. Other metals that can be used to allow only a small amount of heat to flow inside through the metal foil around the vacuum heat insulator include iron, nickel, platinum, tin, titanium, and stainless-steels and carbon steels. The materials of metal deposition include aluminum, cobalt, nickel, zinc, copper, silver, and mixtures thereof. The materials of inorganic oxide deposition include silica and alumina.

Figure 3B:
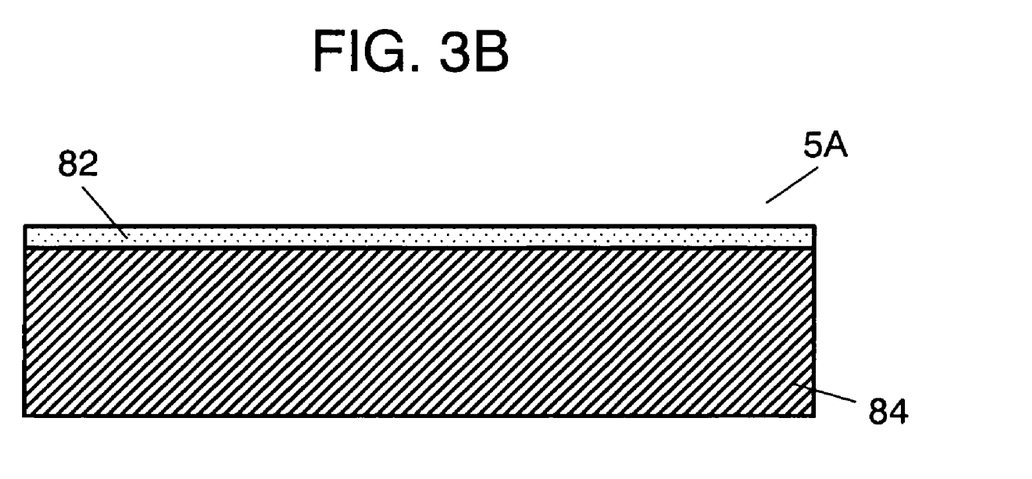

For the substrate of gas barrier layer 5A, a polyimide film and polyphenylnene sulfide film can also be used. For gas barrier layer 5A, a film including substrate 84 of an aramid resin (12-μm-thick) having a glass transition point of 270° C. and deposited layer 82 of a 0.05-μm-thick aluminum deposited on substrate 84 can also be used as shown in FIG. 3B. Aramid films are excellent in gas barrier property even at high temperatures. For this reason, even when the side of the deposited film of the gas barrier layer is attached to a heat source of approx. 150° C., entry of gas into the vacuum heat insulator can be inhibited and heat-insulating property can be maintained. This can inhibit degradation of heat-insulating property caused by heat transferred through the metal, and maintain heat-insulating property even at high temperatures of approx. 150° C.

The aramid-based films have a long-term heat-resistant temperature of 180° C. specified in UL746 B, which is calculated from the half-value period of mechanical characteristics. As described above, an aramid resin film is used for gas barrier layer 5A. In this case, degradation of the mechanical strength of the gas barrier layer is smaller in comparison with the case where the conventional ethylene-vinylalcohol copolymer film is used as a gas barrier layer on the heat source side. This improves resistance of vacuum heat insulator 1 to internal and external shocks. Such a material can also be used for gas barrier layer 5B. To further improve the resistance of vacuum heat insulator 1 to internal shock, a layer made of a material, such as polyethylenenaphthalate, can be added between the heat seal layer and the gas barrier layer, for example.

For protective layers 6A, 6B, 7A and 7B, any film having a melting point higher than those of the films used for heat seal layers 4A and 4B can be used. Specifically, when a tetrafluoroethylene-ethylene copolymer having a melting point of 260° C. is used for heat seal layers 4A and 4B, the materials usable for the protective layers include: tetrafluoroethylene-hexafluoropropylene copolymer having a melting point of 270° C.; tetrafluoroethylene-perfluoroalkoxyethylene copolymer having a melting point of 310° C.; tetrafluoroethylene having a melting point of 330° C.; polyether-ketone having a melting point of 330° C.; polysulfone; and polyether-imide. Among these, films made of fluorine resin and imide resin are preferable because they have high or no melting points and also have flame retardance. In addition, because these films have excellent flexibility, even when fins 12 are bent, bending operation does not cause cracks in protective layers 7A and 7B. Thus, occurrence of pinholes in enveloping members 2A and 2B caused by the cracks can be prevented.

Further, providing two-layered protective layers like this embodiment can reduce the thicknesses of expensive outermost protective layers 7A and 7B and increase the thicknesses of second protective layers 6A and 6B. This can provide a reasonable enveloping member 2 that has excellent property and low cost at the same time. In other words, fluorine resin, polyimide resin, or polyether-imide resin can be used for protective layers 7A and 7B. Polyethylene-terephthalate having a melting point of 260° C., polyethylene-naphthalate having a melting point of 270° C., polyphenylene-sulfide, or the like can be used for protective layers 6A and 6B.

Figure 4:
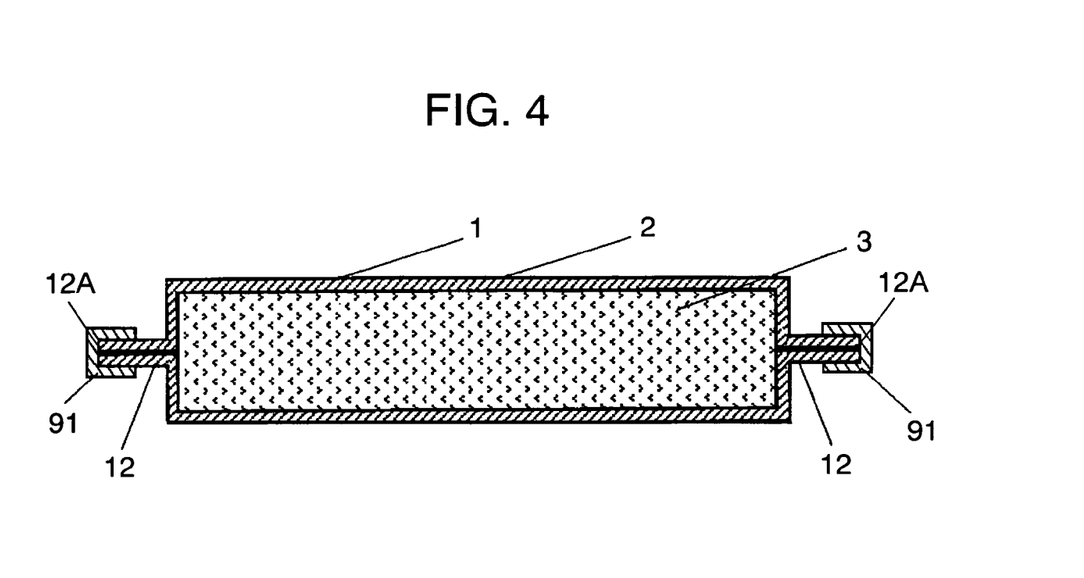
FIG. 4 shows a sectional view showing another fin of a vacuum heat insulator in accordance with the exemplary embodiment.

Further, as shown in FIG. 4, it is preferable to provide flame-retardant member 91 at each end face 12A of enveloping member 2 to cover at least heat seal layers 4A and 4B. It is more preferable that flame-retardant members 91 cover the entire part of end faces 12A. In this case, when flammable films are used for heat seal layers 4A, 4B and the like, a sectional area slightly exposed at each end face of enveloping member 2 is covered by flame-retardant member 91. This makes the entire outer surface of vacuum heat insulator 1 flame-retardant and improves its safety during use.

Specifically, it is preferable that flame-retardant member 91 has flame retardance of VTM-2 or higher specified in UL94 safety standard. Flame-retardant member 91 is structured of an adhesive tape or flame-retardant sealer compliant with UL510 FR. When a flame-retardant sealer is used, processes of positioning a tape, fixing the tape after attachment, and cutting the tape are unnecessary. Thus, operations are simplified.

For core material 3, open-cell foams made of polymers, such as polystyrene and polyurethane, inorganic or organic powder material, and inorganic or organic fiber material can be used without special limitation. For example, as powder material, inorganic powders, such as cohesive silica powder, pulverized powder of foam perlite, diatomite powder, calcium silicate powder, calcium carbonate powder, clay and talk, can be used. As fiber material, it is preferable to use inorganic fiber, such as glass wool and ceramic fiber. Among these, inorganic powder having a diameter of secondary agglomerated particle up to 20 µm is desirable. These powder materials have extremely fine particles. This increases the contact thermal resistance between the particles and reduces the solid heat conductivity of the entire powder. Further, at any pressure up to 10 Torr, these powder materials exhibit extremely small heat conductivity. For this reason, these powder materials are most appropriate for the application under high-temperature conditions where motion of air molecules is active.

Figure 5:
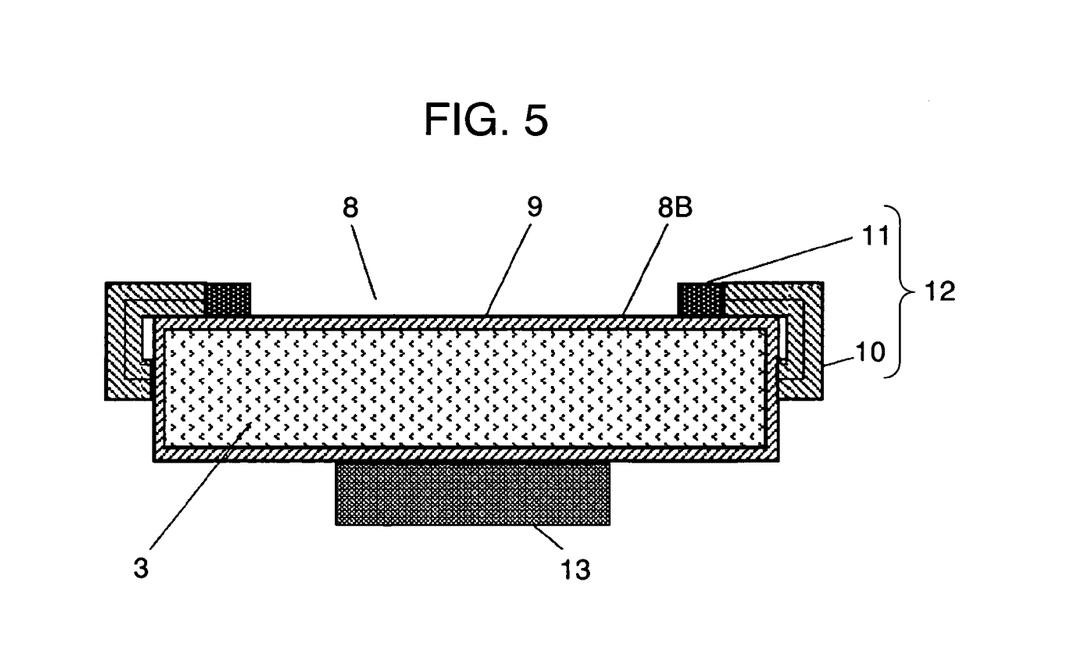
FIG. 5 is a sectional view of another vacuum heat insulator in accordance with the exemplary embodiment.

Next, with reference to the sectional view of FIG. 5, a description is provided of a vacuum heat structure of another structure in accordance with the exemplary embodiment of the present invention. In reference to FIG. 5, vacuum heat insulator 8 is in contact with heating element 13, i.e. a high-temperature portion.

Enveloping member 9 of vacuum heat insulator 8 has a structure same as that of the vacuum heat insulator of FIG. 2; however, their materials are different from each other. In vacuum heat insulator 8, a non-oriented polypropylene film having a melting point of 160° C. is used for heat seal layers 4A and 4B. For gas barrier layer 5A, a polyethylenenaphthalate film (12-µm-thick) having aluminum deposited thereon is used. In other words, as shown in FIG. 3A, the structure of gas barrier layer 5A is similar to that of gas barrier layer 5B of vacuum heat insulator 1. For gas barrier layer 5B of vacuum heat insulator 8, an ethylene-vinylalcohol copolymer film having aluminum deposited thereon is used. Fins 12 are bent to be along heat-insulating surface on the low-temperature side 8B opposite to high-temperature heating element (heat source) 13 so that heat seal parts 11 are protected. Each of fins 12 is made of contact part 10 having no core material 3 inside of enveloping member 9 and heat seal part 11. The constitution of protective layers 6A to 7B of enveloping member 9 and core material 3 is the same as that of vacuum heat insulator 1. For protective layers 6A to 7B, chlorotrifluoroethylene having a melting point of 210° C. can be used, other than the materials used in vacuum heat insulator 1.

In this vacuum heat insulator, even when heating element 13 is at a temperature of 150° C., the temperature of heat seal parts 11 along the heat-insulating surface on the low-temperature side 8B is up to 80° C. In other words, even when a conventional economical resin film having a melting point below 200° C. instead of a resin film having a melting point of at least 200° C. for heat seal layers 4A and 4B, these layers do no degrade. Thus, gas does not enter from heat seal parts 11 to degrade heat-insulating property of vacuum heat insulator 8, and heating element 13 at a temperature of 150° C. is heat-insulated from the heat-insulating surface on the low-temperature side.

Now, because gas barrier layer 5A has a structure same as that of vacuum heat insulator 1, the same effect can be obtained.

The films used for heat seal layers 4A and 4B have melting points above 100° C. and below 200° C. Such films include a non-oriented polypropylene film, high-density polyethylene film, straight-chain low-density polyethylene film, and ethylene-vinylalcohol copolymer film. Having melting points higher than those of general high-density and low-density polyethylene films, the above-mentioned films can be used at higher temperatures. Because of such structures, enveloping member 9 prevents entry of air or moisture vapor into vacuum heat insulator 8 for a long period of time and maintains the heat-insulating property of vacuum heat insulator 8.

If flame-retardant films are used for protective layers 7A and 7B, or flame-retardant members 91 are applied for end faces 12A, the flame retardance of vacuum heat insulator 8 is improved.

Figure 6A:
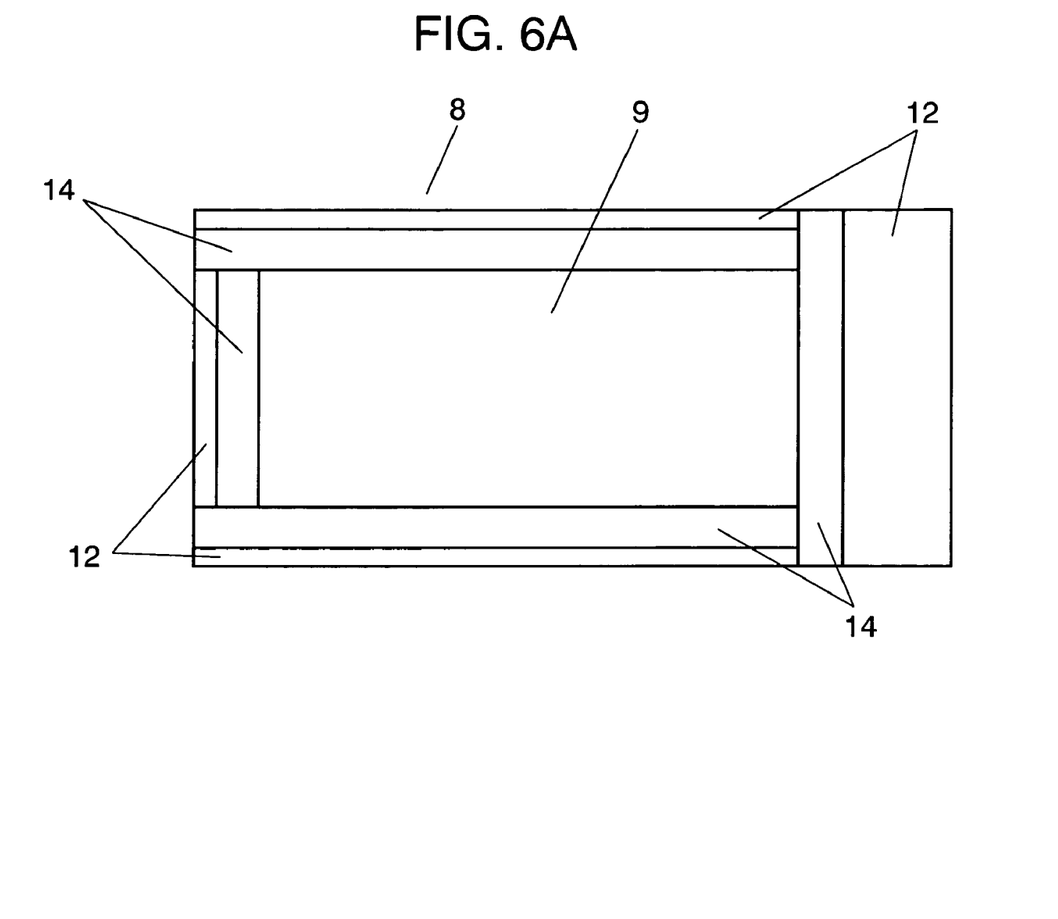
FIG. 6A is a plan view of still another vacuum heat insulator in accordance with the exemplary embodiment.
Figure 6B:
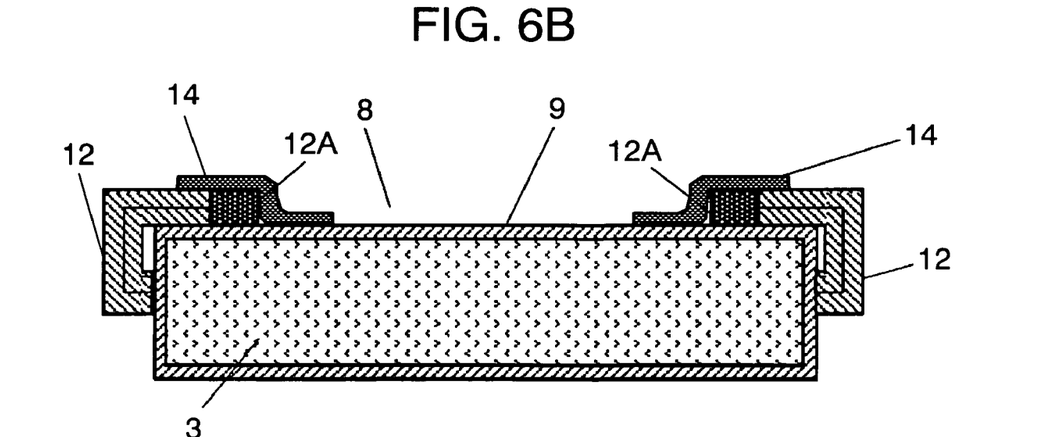
FIG. 6B is a sectional view of the vacuum heat insulator shown in FIG. 6A.

FIG. 6A is a plan view of a still another vacuum heat insulator in accordance with the exemplary embodiment of the present invention. FIG. 6B is a sectional view thereof. Flame-retardant tapes 14 fix fins 12 of vacuum heat insulator 8 to keep the fins bent. At this time, flame-retardant tapes 14 adhere to the vacuum heat insulator in a manner that flame-retardant tapes 14 completely cover the tips of fins 12, so that end faces 12A of enveloping member 9 are not exposed. The structures of other elements are the same as those of the vacuum insulators described before.

The heat conductivity of vacuum heat insulator 8 is 0.0049 W/mK. The heat conductivity of vacuum heat insulator 8 after an accelerated test under aging condition equivalent to five years left in an atmosphere of 150° C. is 0.0125 W/mK.

When flammability of the vacuum heat insulator is confirmed according to Test for Flammability of Plastic Materials for Parts in Devices and Appliance specified in UL94 safety standard, results equivalent to V-0 of this standard are obtained.

In other words, flame-retardant tapes 14 cover at least flammable films, such as non-oriented polypropylene films, that constitute heat seal layers 5A and 5B exposed at end faces 12A of enveloping member 9. Thus, flame retardance is provided as a vacuum heat insulator. This improves the safety of vacuum heat insulator 8 during use.

Figure 7:
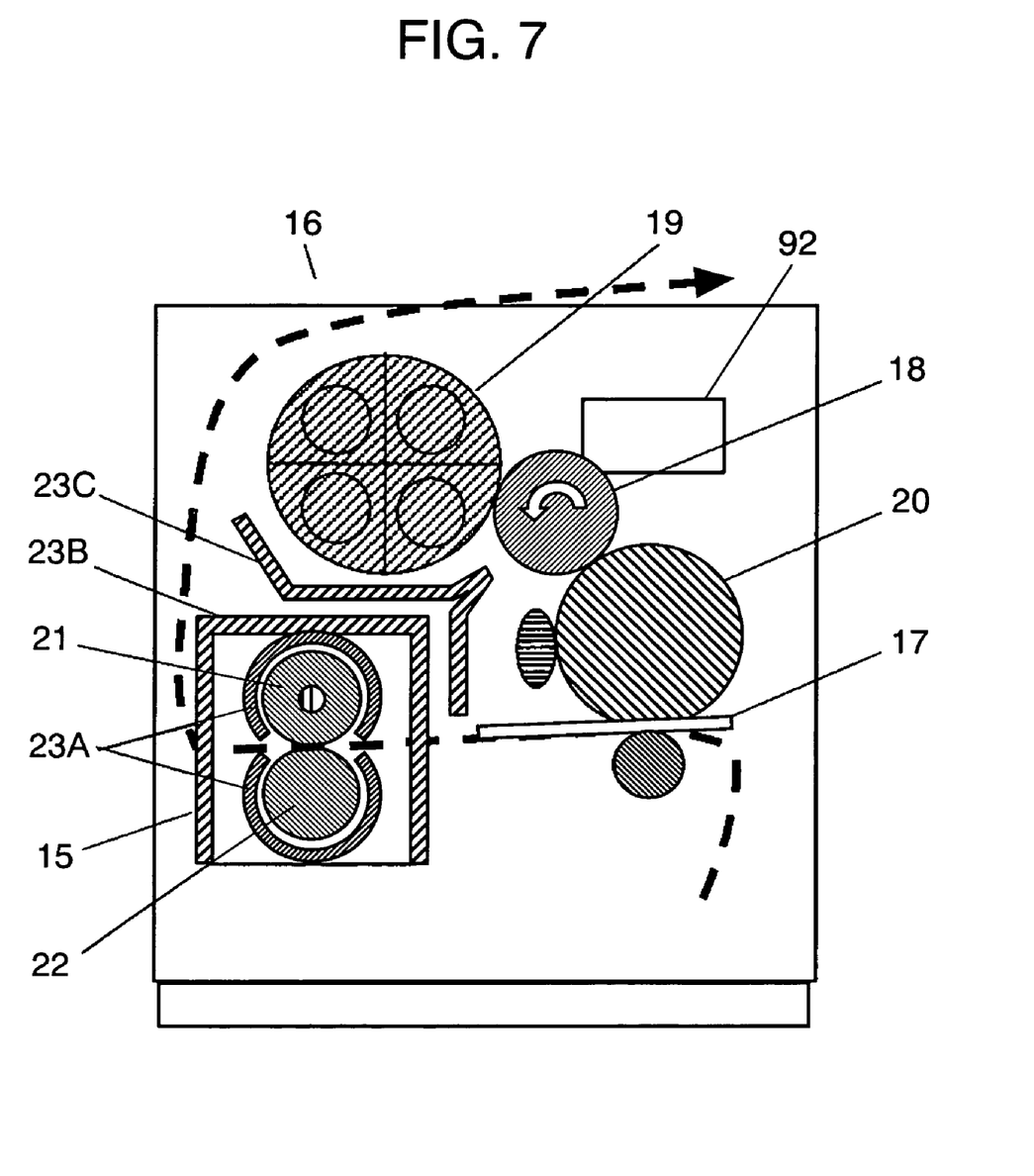
FIG. 7 is a sectional view of a printing machine in accordance with the exemplary embodiment of the present invention.

Next, a description is provided of examples of using vacuum heat insulator 1 or 8 as constituted in accordance with the exemplary embodiment of the present invention in apparatuses. FIG. 7 is a sectional view of a printing machine in accordance with the exemplary embodiment of the present invention.

In printing machine 16 including fixing unit 15, a static electric charge image is formed on the surface of photoconductor drum 18, and toner is adsorbed to the image from toner storage 19. Then, the toner is transferred onto recording paper 17 via transfer drum 20. Recording paper 17 having the toner image transferred thereon is delivered into fixing unit 15, where recording paper 17 passes between heat-fixing roller 21 and press-contacting roller 22 both kept at high temperatures so that the toner is melted and fixed on the recording paper. Control unit 92 controls printing operation.

Around heat-fixing roller 21 and press-contacting roller 22, vacuum heat insulator 23A for thermal insulation is disposed in order to maintain predetermined high temperatures. Additionally, vacuum heat insulator 23B for blocking heat is disposed on the entire side walls and top surface of an outer frame of fixing unit 15 to prevent thermal effect on its environment. Vacuum heat insulator 23C can further be disposed for blocking heat. Each of vacuum heat insulators 23A, 23B, and 23C is structured of any one of the above-mentioned vacuum heat insulators 1 and 8, and vacuum heat insulator 8 with flame-retardant tapes 14 attached thereto.

When vacuum heat insulators 23A, 23B, and 23C are attached as heat-insulating members for fixing unit 15 at temperatures up to 150° C., degradation of the heat seal parts is small as described above and the heat-insulating property can be maintained for a long period of time. Thus, the heat from fixing unit 15, i.e. a heat source at temperatures above 100° C., is blocked. This heat blocking allows control unit 92, toner storage 19, and transfer units including photoconductor drum 18, which are affected by the heat of the heat source and are to be protected, to be kept at temperatures up to 45° C. at which the toner is not adversely affected, for a long period of time. Thus, components and units, such as the transfer unit, control unit 92 and the like, susceptible to external heat can be disposed in proximity to fixing unit 15. This structure can make printing machine 16 using fixing unit 15 compact and improve printing quality.

Further, among the heat-insulating members disposed to surround heat-fixing roller 21 reaching to temperatures of approx. 200° C., vacuum heat insulator 23A is disposed in the outside portion where its temperature decreases to approx. 150° C., or around press-contacting roller 22 where its temperature is approx. 120° C. Such installation can reduce the degradation of the heat seal parts and maintain its heat-insulating property for a long period of time. Thus, the temperatures of heat-fixing roller 21 and press-contacting roller 22, i.e. members to be kept warm that are heated to temperatures above 100° C., can be kept stable by thin vacuum heat insulator 23A. This can reduce energy for heating heat-fixing roller 21 and thus helps to downsize printing machine 19, improve its quality, reduce its rise time, and save energy.

The vacuum heat insulators of the present embodiment can also be used for products requiring heat insulation of a heating element or keeping it warm at temperatures above 100° C. and up to 150° C., other than a fixing unit of a printing machine, such as a copying machine and laser printer.

Figure 8:
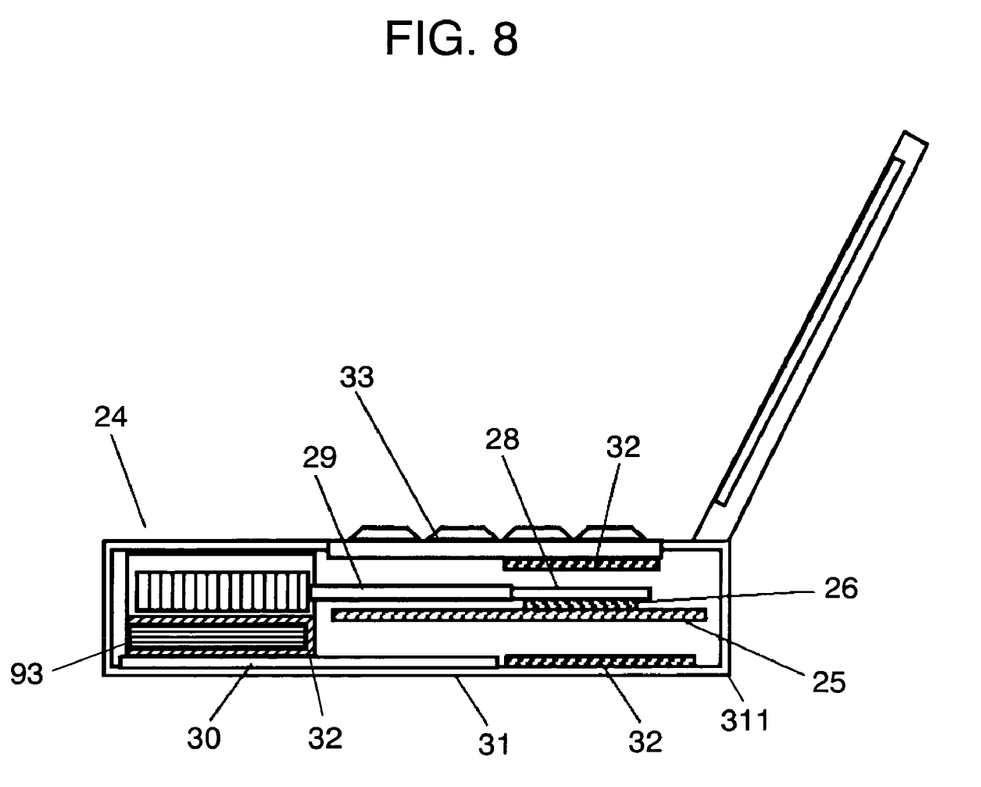
FIG. 8 is a sectional view of a notebook type computer in accordance with the exemplary embodiment of the present invention.

FIG. 8 is a sectional view of a notebook type computer in accordance with the exemplary embodiment of the present invention. Notebook type computer 24 incorporates printed circuit board 25 having CPU 26 and other chips mounted thereon. Cooling unit 27 for CPU 26 is structured of heat transfer block 28 in contact with CPU 26, and heat pipe 29 for transferring heat. Radiator plate 30 diffuses the inside heat and transfers it to bottom surface 31 of the computer to radiate the heat. Vacuum heat insulator 32 is structured of any one of the above-mentioned vacuum heat insulators 1 and 8, and vacuum heat insulator 8 with flame-retardant tapes 14 attached thereto. Vacuum heat insulator 32 has a thickness of 2 mm and flame retardance. Vacuum heat insulators 32 are attached to the inside of bottom surface 31 of the computer directly below CPU 26, and to the rear surface of keyboard 33 exposed from computer 24 directly above CPU 26 by an adhesive in a manner to make intimate contact therewith.

This installation of vacuum heat insulators can decrease the temperatures by 6° C. at the maximum in high-temperature portions, i.e. bottom surface 31 of housing 311 that is the outer shell of computer 24, and the surface of keyboard 33 directly above CPU 26. In other words, an uncomfortable feeling that is generated by a part of the surface of computer 24 abnormally heated can be prevented for a long period of time while the safety of notebook type computer 24 is improved.

Vacuum heat insulators 32 can exert sufficient heat-insulating property even with a small thickness with which the heat-insulating property of a conventional heat insulator is not useful. In addition, vacuum heat insulators 32 have heat-resistant and flame-retardant properties. For this reason, even in a small space, such as the inside of notebook type computer 24, vacuum heat insulators 32 can be used with ensured safety for a long period of time, like other precision components. Thus, adverse effects of a heating element, such as CPU 26 inside of electronic equipment including notebook type computer 24, on other components can be prevented.

The vacuum heat insulators of the present embodiment can also be used to thermally insulate built-in accessories 93, such as a hard disk drive, installed in notebook type computer 24 from high temperatures.

In this manner, vacuum heat insulator 32 protects members to be protected that are affected by the heat of a heat source, such as keyboard 33, housing 311, and built-in accessories 93, from the heat of CPU 26, i.e. the heat source at temperatures above 100° C. The vacuum heat insulator can be used for various kinds of precision components requiring flame retardance in the same manner, other than notebook type computers.

Figure 9:
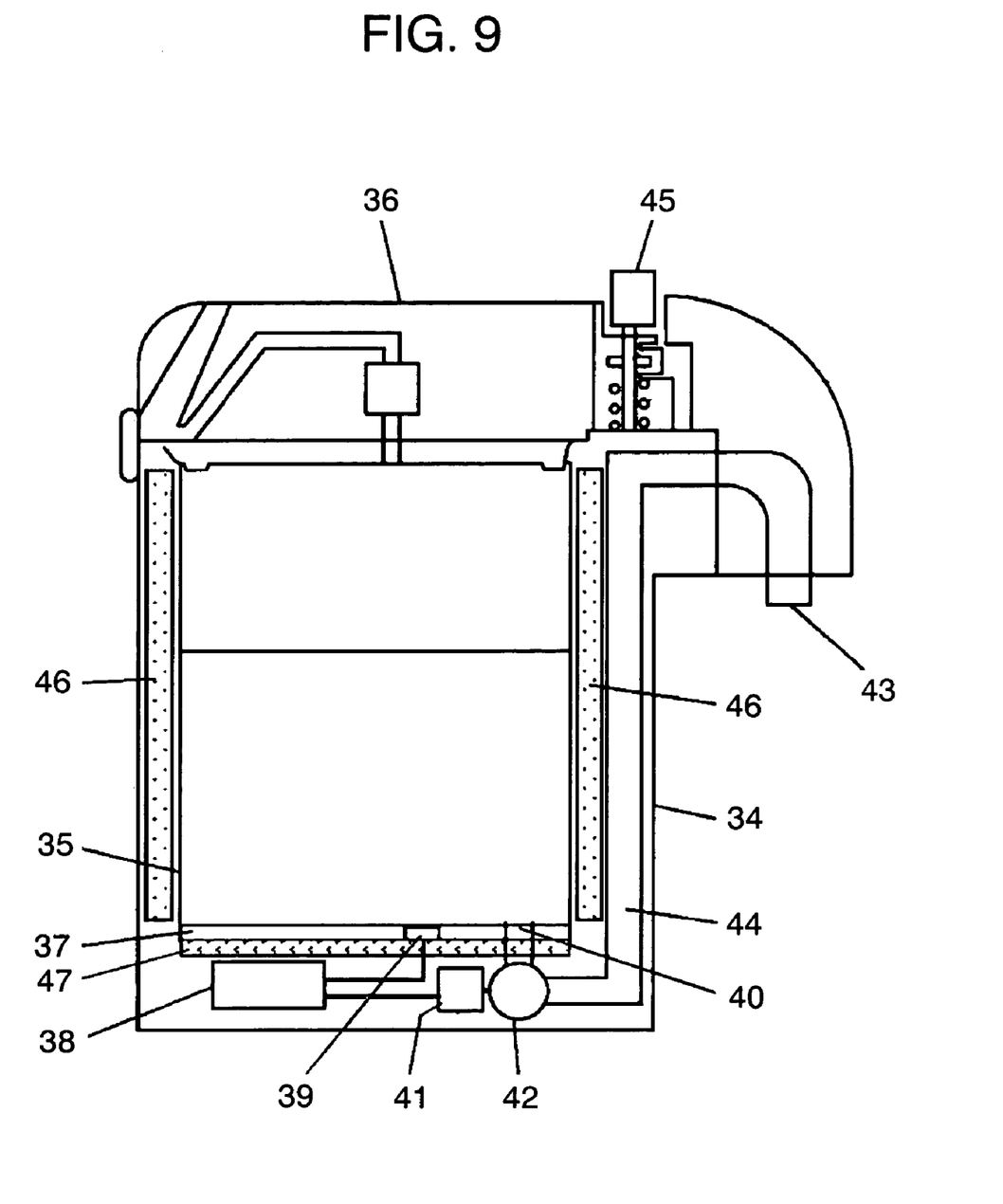
FIG. 9 is a sectional view of an electric kettle in accordance with the exemplary embodiment of the present invention.

FIG. 9 is a sectional view of an electric kettle in accordance with the exemplary embodiment. Electric kettle 34 has hot-water storage 35 for boiling water and storing hot water, and openable/closable lid 36 for covering the top surface thereof.

Donut-shaped heater 37 is attached to the bottom surface of hot-water storage 35 in intimate contact therewith. Control unit 38 receives signals from temperature sensor 39 to control heater 37 so that the temperature of the hot water can be maintained at a predetermined temperature. Hot-water pipe 44 connects water inlet 40 provided on the bottom surface as well and water outlet 43 via pump 42 driven by motor 41. Depressing press button 45 to activate motor 41 causes hot water to come out from the electric kettle.

Further, on the side face of hot-water storage 35, vacuum heat insulator 46 is wrapped. Similarly, vacuum heat insulator 47 for high temperature is disposed to surround heater 37 on the bottom surface. These vacuum heat insulators inhibit escape of the heat of hot-water storage 35 and a decrease in the temperature of hot water. Vacuum heat insulator 46 on the side face has conventionally been disposed and has a structure capable of resisting to a temperature of 100° C. Vacuum heat insulator 47 on the bottom surface is structured of any one of the above-mentioned vacuum heat insulators 1 and 8, and vacuum heat insulator 8 with flame-retardant tapes 14 attached thereto. Vacuum heat insulator 47 keeps heater 37 warm, which is a member to be thermally insulated that is heated to temperatures above 100° C.

Disposing vacuum heat insulator 47 in a portion in which a conventional insulating material cannot be disposed because of its high temperature to insulate heat in this manner can reduce the power consumption by approx. 3% and maintain the performance of the electric kettle for a long period of time. In addition, at the bottom surface of the body, a space need not be provided for heat insulation. This reduces the volume under hot-water storage 35, thus making electric kettle 34 compact.

Vacuum heat insulator 1 can be used for these apparatuses incorporating a heating element or member to be thermally insulated at temperatures above 100° C. and up to 200° C. Vacuum heat insulator 8 can be used for these apparatuses incorporating a heating element or member to be thermally insulated at temperatures above 100° C. and below 200° C.

INDUSTRIAL APPLICABILITY

In a vacuum heat insulator of the present invention, a heat seal layer of its enveloping member of a laminated structure is made of a film having a melting point of at least 200° C. Alternatively, the heat seal layer is made of a film having a melting point above 100° C. and below 200° C., the melting point of its protective layer is at least 200° C., and fin portions are bent on the low-temperature side. Either of these structures can inhibit a decrease in gas barrier property even in a high-temperature atmosphere of approx. 150° C. Thus, the heat-insulating property of the vacuum heat insulator is maintained for a long period of time. In addition, for a gas barrier layer and protective layer, films having melting points higher than that of the heat seal layer is used. Thus, a vacuum heat insulator can be fabricated without any problem in heat-sealing the enveloping member. This vacuum heat insulator is preferable for heat insulation of apparatuses and keeping apparatuses warm, especially those having high-temperature portions, such as a printing machine including a copying machine and laser printer, electronic equipment including a computer, and water heater.

The invention claimed is:

1. An apparatus comprising:
   a heat source at a temperature above 100° C. and below 200° C.;
   a member to be protected and affected by heat of the heat source; and
   a vacuum heat insulator comprising:
   a heat seal layer;
   a core material;
   an enveloping member covering the core material and including:
   a gas barrier layer provided outside of the heat seal layer; and
   a protective layer provided outside of the gas barrier layer; and
   a fin to which the enveloping member is welded;
   wherein a melting point of the heat seal layer is above 100° C. and below 200° C., a melting point of the protective layer is at least 200° C., at least the fin is disposed on a low-temperature side of a heat-insulating surface of the vacuum heat insulator, and the vacuum heat insulator blocks thermal effect of the heat source on the member to be protected.

2. The apparatus according to claim 1, wherein
   the apparatus is a printing machine for fixing a toner onto a recording paper;
   the heat source is a fixing unit for fixing the toner onto the recording paper;
   the member to be protected includes:
   a toner storage for storing the toner to be melted and fixed onto the recording paper by the fixing unit;
   a transfer unit for transferring the toner onto the recording paper; and
   a control unit for controlling printing operation; and
   the vacuum heat insulator is provided on an outer periphery of at least one of the fixing unit, the toner storage, and the control unit.

3. The apparatus according to claim 1, wherein
   the apparatus is a notebook type computer;
   the heat source is a CPU;
   the member to be protected is at least one of:
   a housing forming an outer shell of the notebook type computer;
   a keyboard exposed from the notebook type computer; and
   a build-in accessory provided in the notebook type computer;
   the vacuum heat insulator is disposed in at least one of a space between the CPU and a bottom surface of the housing, a space between the CPU and the keyboard, and a space between the CPU and the built-in accessory.

4. An apparatus comprising:
   a heat source at a temperature above 100° C. and below 200° C.;
   a portion to be kept warm and heated to a temperature above 100° C. and below 200° C.; and
   a vacuum heat insulator comprising:
   a core material;
   an enveloping member covering the core material and including:
   a heat seal layer;
   a gas barrier layer provided outside of the heat seal layer; and a protective layer provided outside of the gas barrier layer; and a fin to which the enveloping member is welded;

wherein a melting point of the heat seal layer is above 100° C. and below 200° C., a melting point of the protective layer is at least 200° C., at least the fin is disposed on a low-temperature side of a heat-insulating surface of the vacuum heat insulator, and the vacuum heat insulator maintains a temperature of the portion to be kept warm.

5. The apparatus according to claim 4, wherein the apparatus is a fixing unit for melting and fixing a toner onto a recording paper, provided in a printing machine;

the portion to be kept warm includes:

a heat-fixing roller provided in the fixing unit; and a press-contacting roller provided in the fixing unit and bringing the recording paper into press contact with the heat-fixing roller; and the vacuum heat insulator is disposed to surround at least one of the heat-fixing roller and the press-contacting roller.

6. The apparatus according to claim 4, wherein the apparatus is a water heater including a hot-water storage therein;

the portion to be kept warm is a heater in proximity to the hot-water storage; and the vacuum heat insulator is disposed in at least a portion in proximity to the heater.

\* \* \* \* \*